United States Patent

[11] 3,542,167

| [72] | Inventor | Alexander J. Wilson<br>Sutton Coldfield, England |
|---|---|---|
| [21] | Appl. No. | 825,154 |
| [22] | Filed | May 16, 1969<br>Continuation-in-part of Ser. No. 650,415,<br>June 30, 1967, abandoned. |
| [45] | Patented | Nov. 24, 1970 |
| [73] | Assignee | Girling Limited<br>Birmingham, England<br>a British Company |
| [32] | Priority | June 21, 1968 |
| [33] |  | Great Britain |
| [31] |  | 29,701/68 |

[54] VEHICLE BRAKING SYSTEMS
16 Claims, 4 Drawing Figs.

[52] U.S. Cl. ............................................ 188/181, 303/21

[51] Int. Cl. ........................................... B60t 8/16
[50] Field of Search ................................. 303/21, 61—63, 68—69; 188/181

[56] References Cited
UNITED STATES PATENTS

| 2,107,823 | 2/1938 | Hallot ........................ | 188/181 |
| 2,961,275 | 11/1960 | Bent ........................... | 188/181X |
| 2,964,048 | 12/1960 | Mortimer .................... | 188/181X |

*Primary Examiner*—Milton Buchler
*Assistant Examiner*—John J. McLaughlin, Jr.
*Attorney*—Scrivener, Parker, Scrivener and Clarke ABSTRACT: In a vehicle braking system a resilient lever transmits a force from an input member to a control member for applying a wheel brake, and means responsive to deceleration of the braked wheel exerts on the resilient lever a force in opposition to a force applied to it by the input force.

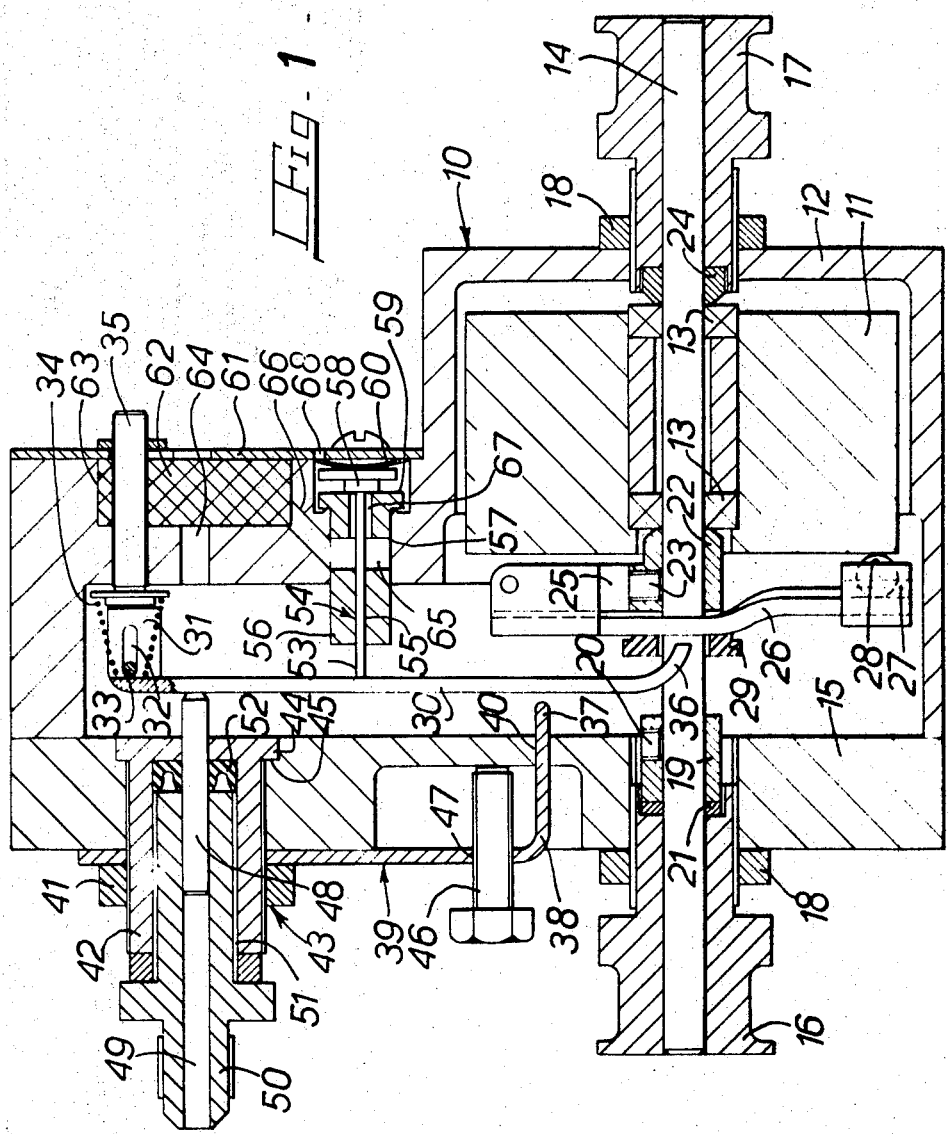

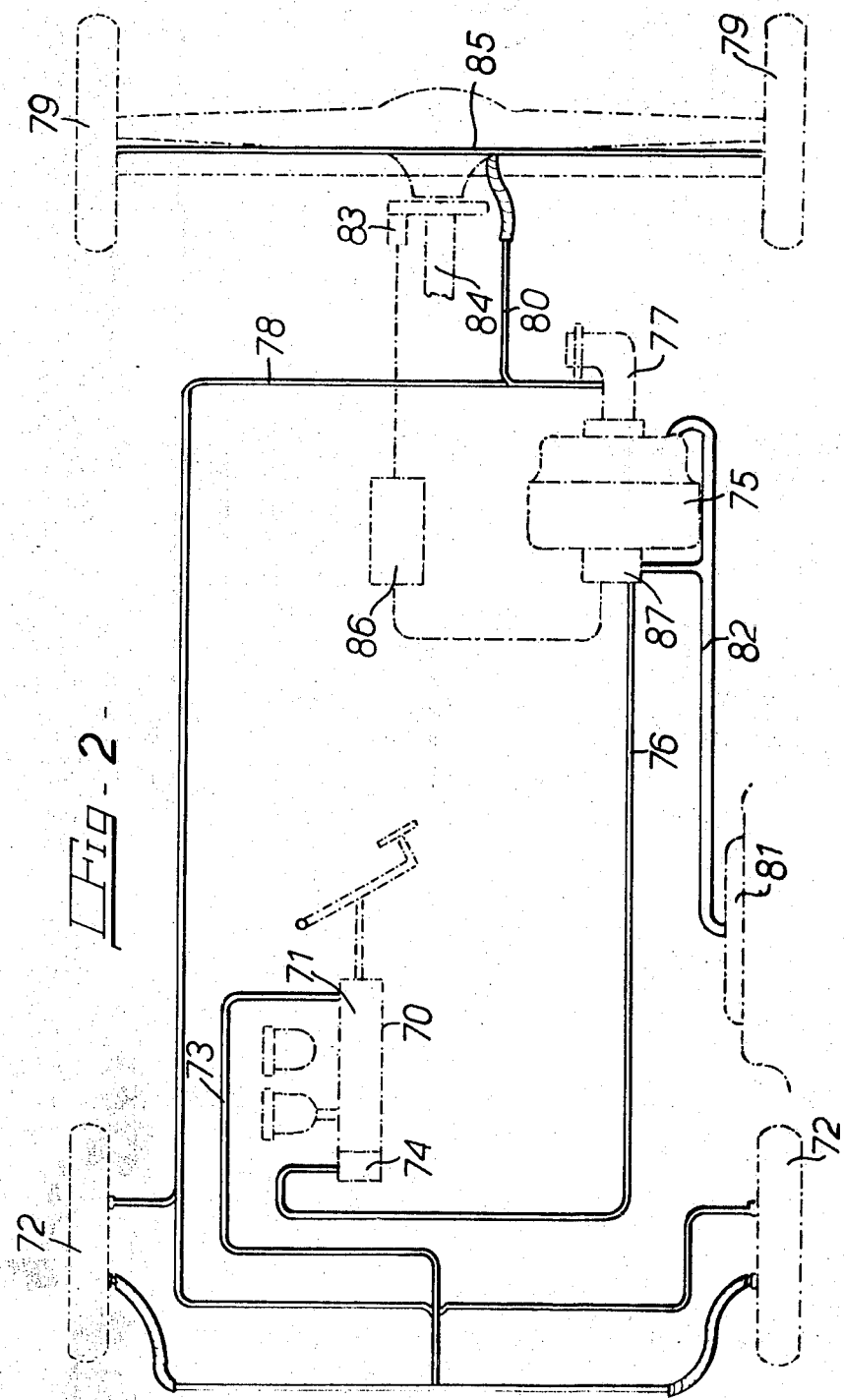

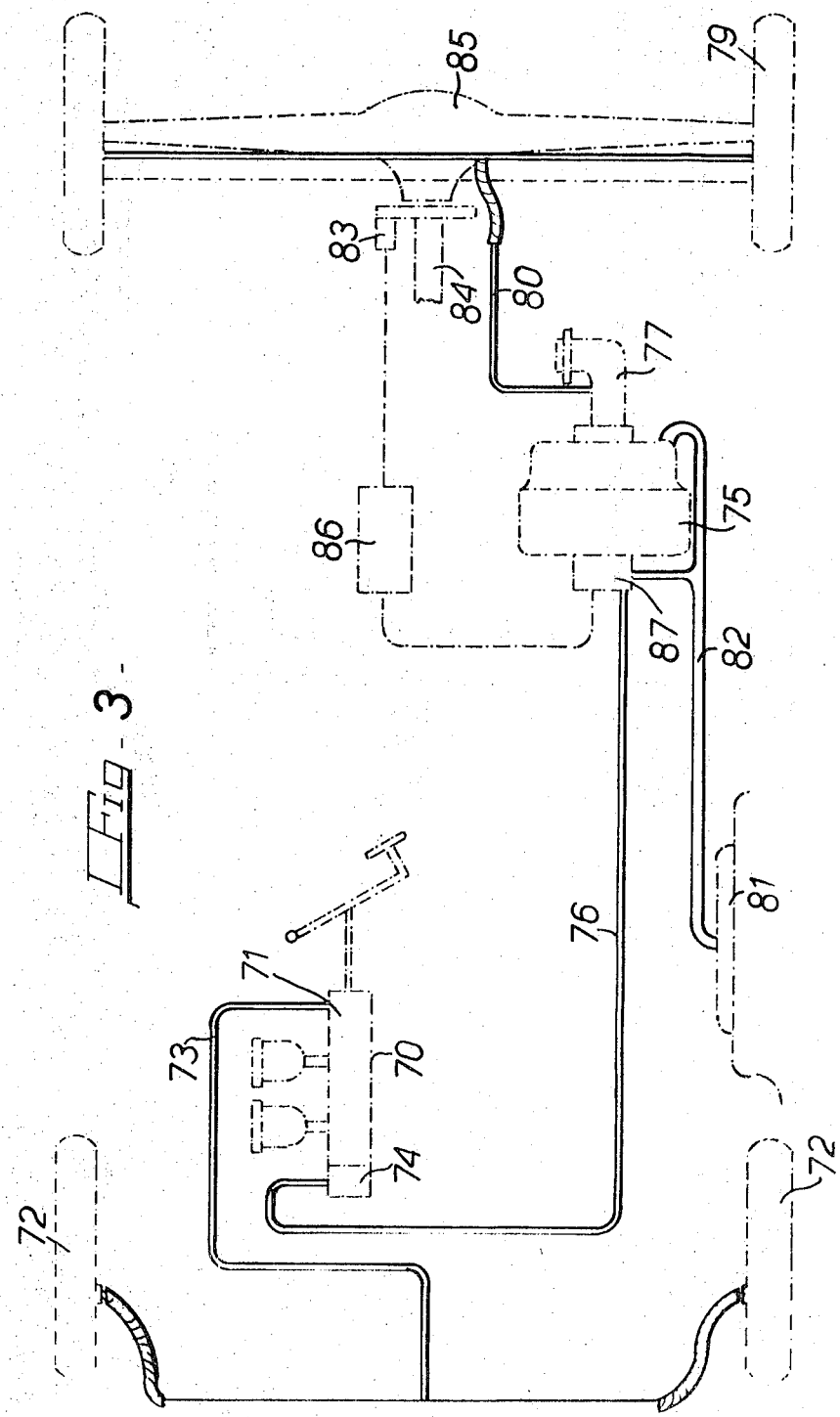

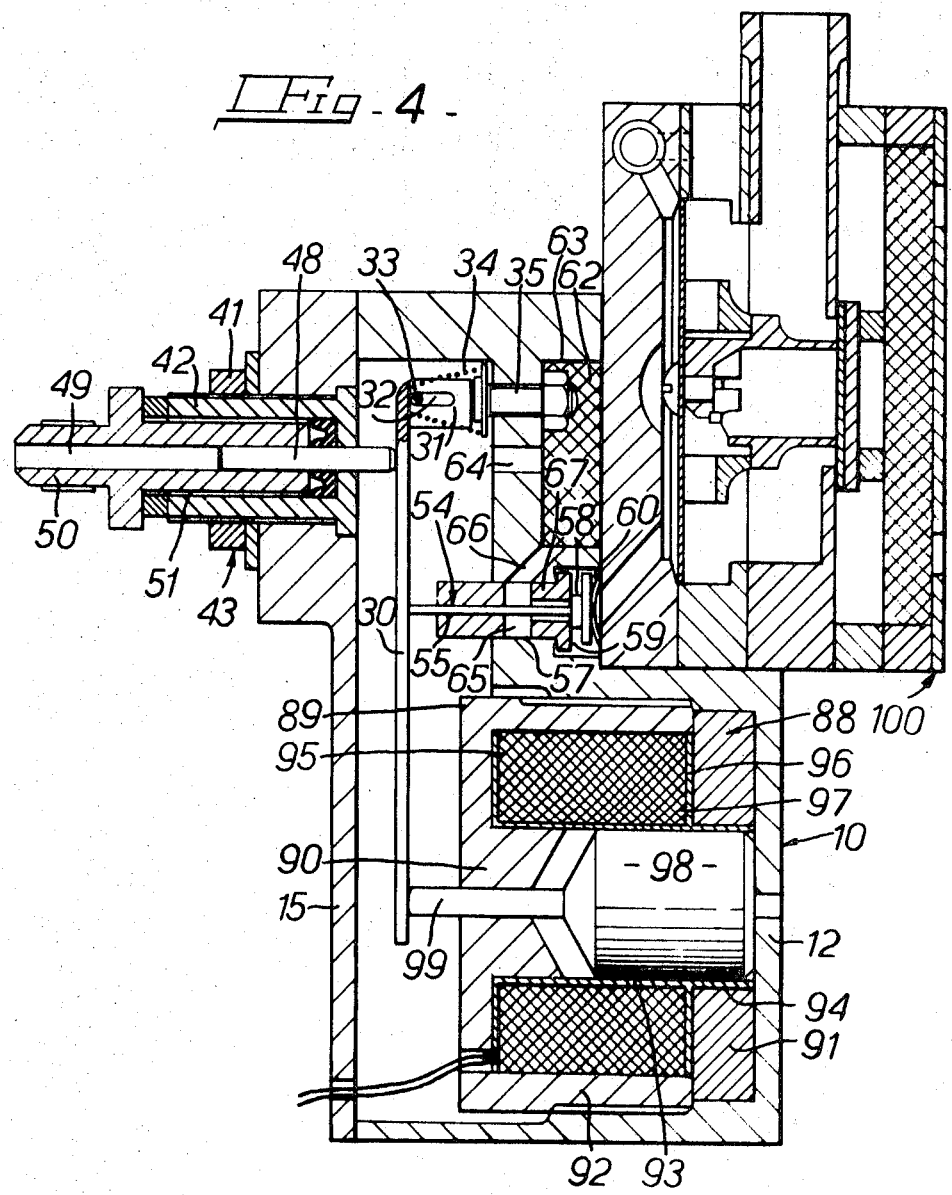

VEHICLE BRAKING SYSTEMS

This application is a Continuation-in-part of my U.S. Pat. application Ser. No. 650,415, filed June 30, 1967 now abandoned.

SPECIFIC DESCRIPTION

This invention relates to improvements in vehicle braking systems.

According to our invention in brake control apparatus for a vehicle braking system incorporating a brake on at least one wheel of the vehicle the improvement comprises a brake control member adapted to apply the wheel brake, a nonrigid resilient lever adapted to actuate said brake control member, an input member adapted to apply an input force directly to said resilient lever, means responsive to deceleration of said braked wheel adapted to apply to said resilient lever a force in opposition to said input force, and means for urging said resilient lever at all times into engagement with said input member and said deceleration responsive means, the arrangement being such that in an initial application of the brake, said lever exerts a force on said deceleration responsive means directly and, upon deceleration the braked wheel exceeding a predetermined value, said deceleration responsive means exerts a force on said resilient lever in opposition to the input force.

The deceleration sensing means may comprise a flywheel mechanism driven from the vehicle wheel, or an electromagnetic device responsive to signals received from means sensing the deceleration of the braked wheel.

In an inoperative condition the lever acts as a lever of the first order and is adapted to pivot about a fulcrum at an intermediate point in its length being urged at one end into engagement with the deceleration sensing means by a spring acting on the lever at its opposite end. When the brake is actuated the input member acts on the lever at a position on the side of the fulcrum remote from the end in engagement with the deceleration sensing means to move the lever in a direction against the loading in the spring simultaneously actuating the brake control member to apply the brake and transmitting the applying force to the deceleration sensing means.

The actuation of the brake control member is controlled by the magnitude of the brake application, that is the load applied from a pedal to the input member. In the course of a brake application the spring travel is taken up and the lever is then rigidly supported at the spring end. Further increase in the pressure applied to the input member bends the lever and the actuating force applied to the control member by air pressure is increased. If the braked wheel then decelerates more rapidly than the vehicle, a feedback force is applied to the lever resulting in reduction of the air pressure supplied to the control member.

Some vehicle braking systems and brake control apparatus incorporating our invention are illustrated in the accompanying drawings in which:

FIG. 1 is a section through one form of brake control apparatus;

FIG. 2 is a layout showing the installation in a vehicle of a braking system incorporating another form of brake control apparatus;

FIG. 3 is a layout similar to that shown in FIG. 2 but including a modification; and FIG. 4 is a section through another form of brake control apparatus embodied in the layouts of FIGS. 2 and 3.

In the brake control apparatus illustrated 10 is a housing in which is located a flywheel 11 positioned adjacent to one end wall 12 of the housing. The flywheel is freely rotatably mounted on bearings 13 on a spindle 14 which is adapted to be driven from a wheel of the vehicle and which extends transversely through the housing. Opposite ends of the spindle, which project from the end wall 12 and an opposite end wall 15, are rotatably mounted in fittings 16, 17 which are screw-threaded into engagement with tapped holes in the end walls. Each fitting is held against rotation by a locking nut 18 abutting the external surface of the end wall through which that fitting is screwed. The spindle is held against axial movement relative to the housing in a direction towards the left in the drawing by a collar 19 secured to the spindle by a screw 20 and abutting at its outer end against a washer 21 housed in an annular recess in the inner end of the fitting 16. The spindle is held against axial movement in the opposite direction by a collar 22 which rotates with the spindle and to which it is secured by a screw 23. The collar at its outer end engages against one bearing 13 and the other bearing abuts against a thrust member 24 housed in an annular recess in the fitting 17.

The collar 22 has an integral arm 25 extending outwardly in a radial direction, and a drive arm 26 pivotally connected at one end to the outer end of the integral arm 25 extends radially in the opposite direction across the plane of the flywheel. At its free end the drive arm 26 has a ramp 27 with which cooperates a ball 28 located between the arm and the adjacent plane face of the flywheel to drive it by a nonrotatable thrust member 29 acting on the drive arm 26 and positioned between the drive arm and the end wall 15 of the housing.

A lever 30 constructed from a resilient material is mounted in the housing at its upper end the lever has a pair of parallel lugs 31 which extend towards the right in the drawing. Each lug 31 is provided with a transverse slot 32 which receives the inner end of a pin 33 projecting inwardly from an adjacent side of the housing. The lever 30 is loaded by a light conical compression spring 34 abutting between the lever and the inner end of an adjustable stop 35 screwed through the end wall 12 of the housing. At its lower end the lever has a bifurcated portion 36 which straddles the spindle and is curved towards the flywheel engaging the thrust member 29 at its outer end.

At a position adjacent to its lower end the lever is adapted to pivot on a fulcrum 37 comprising the inner end of a cranked portion 38 of a flexible strip 39 which extends through a slot or opening 40 in the wall 15. The opposite end of the strip is held against the outer face of the end wall 15 by a locknut 41 screw-threaded onto an externally screw-threaded portion 42 of a member 43 having a head 44 received in an internal recess 45 in the end wall 15. The position of the fulcrum in a transverse direction is adjustable by rotation of a bolt 46 screw-threaded through a tapped hole 47 in the strip and rotatably secured at its inner end in the end wall 15.

At a position adjacent to its upper end the lever is engaged by the inner end of a piston 48 working in a bore 49 in a union 50 which is screwed into an internal bore 51 of the member 43 and abuts at its inner end against a seal 52.

At a position between the point at which the lever 30 is engaged by the piston 48 and the point at which the lever engages the fulcrum 37, on the opposite side the lever acts on the inner end of a stem 53 of an air control valve 54 controlling the admission of air to a servo or relay valve (not shown). The stem 53 of the valve 54 works through an axial bore 55 in an insert 56 located in an opening 37 in the end wall 12 of the housing and the head 58 of the valve is normally held in engagement with a seating 59 on its outer end of the insert 56 by a Belleville or other spring washer 60 abutting against a plate 61 secured against the end wall 12 of the housing.

An air inlet filter 62 is retained in a recess 63 in the end wall 12 above the insert 56 by the plate 61 which has an inlet port 64 permitting air to enter the filter. The filter 62 communicates with a radial port 65 in the insert through an oblique passage 66 in the end wall 12 of the housing, and the portion of the bore 55 in the end of the insert on the outer side of the radial port 65 is enlarged to provide a passage 67 providing communication between the radial port 65 and an outlet port 68 in the plate 61 leading to the servo or relay valve when the servo valve is open.

The union 50 is connected to a pedal operated master cylinder, and the air outlet port 68, controlled by the valve 54, is connected to a relay valve controlling energisation of a booster-operated hydraulic booster or servomotor connected to the slace cylinders or the brakes on a pair of wheels of the vehicle, usually the rear wheels.

In the operative position with no input pressure on the piston 48 the spring 34 holds the lever in engagement with the piston 48 in a position more to the left than that shown in the drawing, the pins 33 being intermediate the ends of the slots 32.

The lever 30 engages the fulcrum 37 and the spring 34 ensures a predetermined load between the ball 20 and the flywheel 11 so that when the spindle 14 is driven the flywheel is also driven through the friction coupling between the ball 28 and the flywheel.

When fluid pressure is applied to the piston 48 from the master cylinder, the piston 48 pushes the upper end of the lever to the right in the drawing until the pins 33 engage the left-hand ends of the slots 32.

The lever leaves the fulcrum 37 and the valve head 58 is moved away from its seat 59 against the spring washer 60 to allow atmospheric air to pass from the inlet port 64 to the servo or relay valve through an air outlet port 68 to energise the booster and apply the brakes.

The opening of the valve 54 is dependent upon the magnitude of the brake application until the travel allowed by the length of the slot 32 is taken up. Further application of the brake bends the lever 30 between the points 33 and 36 at each end, and the resilience of the lever 30 then determines the degree of opening of the control valve 54.

In response to the movement of the piston 48 in the application of the brake the ramp 27 and the lever 30 exert on the ball 28 and the adjacent face of the flywheel 11 through the thrust member 29 and the drive arm 26, a force proportional to the input force. This force creates friction at the flywheel face which acts to decelerate the flywheel, the deceleration being proportional to the input pedal force.

It is arranged that the braking of the wheel exceeds that demanded by the pedal input load so that, while the flywheel is decelerated in accordance with the pedal input load, the road wheel is decelerated in excess of this and so is the spindle 14.

Relative rotation now takes place between the spindle 14 and the flywheel 11 with the spindle decelerating more than the flywheel, and the ball 28 runs up the ram 27 at the free end of the arm 26 with the result that the arm 26 is moved angularly in a clockwise direction about its pivotal connection with the arm 25 to apply to the free end of the lever 30, through the thrust member 29, a force tending to move the lever angularly about the pin 33 as a fulcrum to oppose the input force and tend to close the air control valve 54.

The braking of the wheel will be relieved and the wheel will accelerate again and the braking sequence will then be repeated.

The successive braking and reacceleration of the road wheel results in the road wheel having an effective deceleration which is very close to the deceleration of the flywheel. In use, the oscillations decay until a steady deceleration is achieved.

Advantages of our invention are that the brake control apparatus has a stable response and wide variations in wheel acceleration are avoided so that violent response is not obtained on gentle brake applications.

The servo or relay valve controlling energisation of the hydraulic booster or servomotor and controlled by operation of the air control valve 54 may conveniently be of the kind described in U.S. Pat. No. 3,331,641 and forming the subject matter of our U.S. Pat. No. 3,310,350.

However, in this embodiment the servo or relay valve has been proportional so that its response to the opening of the air control valve 54 to give a corresponding brake output pressure. That is, instead of merely opening fully to give maximum brake pressure, the servo or relay valve is adapted to deliver a pressure consistent with the amount by which the air control valve 54 has opened.

Furthermore the servo or relay valve is adapted to deliver to the brake at all times pressure slightly in excess of that consistent with the force applied by the piston 48 so that deceleration sensing device formed by the flywheel 11, ball 28, ramp 27 and drive arm 26, always operate to limit the braking effort by a slight amount. In this way the deceleration sensing device comes into operation on each and every brake application so that the chance of the device becoming inoperative for lack of use are eliminated.

Reducing the mass of the flywheel 11, which has the effect of reducing the inertia of the flywheel, permits the flywheel to be decelerated due to the friction and the flywheel force in the application of the brake. This in turn delays the point at which a force is transmitted to the piston 48 through the lever 30 due to the ball 28 running up the ramp 27 at the free end of the arm 26.

By carefully selecting the mass of the flywheel 11, the point at which the opposing force is transmitted to the piston 48 is chosen in accordance with the characteristics of the particular braking system in which the brake control apparatus is incorporated.

In the braking system shown in FIG. 2 a pedal-operated hydraulic tandem master cylinder 70 has a first pressure space 71 connected directly to brakes on the front wheels 72 of the vehicle through a pipeline 73 and a second pressure space 74 connected to a booster-operated auxiliary hydraulic master cylinder assembly 75 through a pipeline 76.

A pressure space of the auxiliary master cylinder 77 of the booster assembly 75 is connected to the brakes on the front wheels 72 through a pipeline 78, and to the brakes on the rear wheels 79 of the vehicle through a pipeline 80.

Opposite sides of a movable wall of the booster assembly 75 are normally connected to a source of vacuum, such as an inlet manifold 81 of the vehicle, through a pipeline 82.

To apply the brakes, the tandem master cylinder 70 is actuated and liquid is supplied to the front wheel brakes through the pipeline 73. Simultaneously liquid is supplied to the booster assembly 75 which closes a control valve to isolate a constant pressure chamber on one side of the movable wall from a variable pressure chamber on the opposite side of the movable wall and thereafter to open a further valve in the booster assembly 75 to place the variable pressure chamber in communication with atmospheric air. This energises the booster and actuates the piston of the auxiliary master cylinder 77 to supply liquid under pressure to the brakes of the rear wheels 79 of the vehicle through the pipeline 80, and to the brakes on the front wheels 72 of the vehicle through the pipeline 78 to augment the pressure applied to the brakes on the front wheels.

When the brakes are applied the speed of each of the rear wheels 79 alters. This change in speed is sensed by an electric wheel sensing unit 83, shown here mounted on the cardan shaft 84 of the vehicle adjacent to the back axle 85, and electric signals from the wheel sensing unit 83 are processed by an electronic control module 86 which produces a control signal which it passes to brake control apparatus 87 incorporated into the booster assembly 75. This brake control apparatus 87 is thus adapted to regulate the operation of the booster assembly 75 to control the application of liquid under pressure to the brakes on the rear wheels 79 of the vehicle through the pipeline 80, and to the brakes on the front wheels 72 of the vehicle through the pipeline 78, by correcting the pressure required in accordance with the pressure supplied to the control apparatus 77 by an amount determined by the magnitude of a feedback force as will hereinafter be described. The brake application is thus modified to avoid excessive wheel deceleration.

Alternatively, the electric sensing unit 83 may be replaced by two separate sensing devices each sensing the deceleration of one of the vehicle wheels. In this case the signals from the sensing devices are fed into a comparator which compares the signals, and the signal which is selected is processed by the control module 86 as described above. The selection of the signal to be used may by the slowest wheel, the fastest decelerating wheel or the rear wheel speed.

The brake control apparatus 87 embodied in the braking system illustrated in FIG. 2 is shown in details in FIG. 4. This control apparatus is similar to that shown in FIG. 1 except that the mechanical deceleration sensing means comprising the flywheel and lever assembly have been replaced by magnetic means operable in accordance with signals received from the sensing unit 83, and the adjustable flexible strip 39 has been omitted. Apart from this the construction shown in FIG. 4 is identical with that illustrated in FIG. 1 and corresponding reference numerals have been used to indicate corresponding parts.

In the construction illustrated in FIG. 4 the end wall 12 integral with the base of the housing 10 is constructed from a nonmagnetic material, such as aluminium. A magnetic shell 88 is located in the housing 10 in a space defined between the end wall 12, the base and upper wall continuous in the end wall and parallel to the base. The shell 88 comprises a substantially cup shaped cage 89 having a central boss 90 which extends towards the end wall 12, and an annular end plate 91 located between the end wall and the free end of the peripheral wall 92 of the cage 89. One end of a nonmagnetic insulator 93 in the form of a sleeve receives the boss 90, and its other end is received in a central opening, 94 in the end plate 91. The insulating sleeve 93 is provided with a pair of annular radially extending integral flanges of which the flange 95 at the said one end of the insulating sleeve 93 engages with the inner face of the end wall of the cage, and the other flange 96 engages with the inner face of the end plate 91.

A coil 97 housed between the sleeve 93 and the wall 92 of the cage 89 is connected to the sensing unit 83. A magnetic solenoid core 98 working in the sleeve 93 has at its forward end an axial stem 99 extending through a central opening in the boss 90 and engaging with the lever 30 adjacent to its free end.

In the operative position with no input pressure on the piston 48 the spring 34 holds the lever 30 in a position in which the pins 33 are located intermediate the ends of the slots 32, and the lever adjacent to its lower end engages with the stem 99 of the core 98 to hold the core in a position spaced from the boss 99 so that there is an air gap therebetween.

When liquid under pressure from the pressure space 74 of the master cylinder is applied to the piston 48 when the tandem master cylinder 70 is actuated, the piston 48 pushes the upper end of the lever to the right in the drawing until the pins 33 engage the left-hand ends of the slots 32 the lever pivoting about the outer end the stem 99 as a fulcrum. The valve head 58 is moved away from its seat 59 against the force in the spring washer 60 to allow atmospheric air to pass from the inlet port 64 to the servo or relay valve generally indicated at 100 to energise the booster of the booster assembly. This actuates the piston of the auxiliary master cylinder 77 to apply the brakes on the rear wheels 79 and augment the application of the brakes of the front wheels 72.

As in the embodiment of FIG. 1, for a light brake application the opening of the valve 54 is proportional to the magnitude of the brake application. When the brake application is of a magnitude which is sufficient to move the lever 30 through a distance such that the travel of the slot 32 is fully taken up, further application of the brake causes the rod 48 to bend the resilient lever 30 and thus open the valve 54 further. This additional opening is thus modified by the resilience of the lever.

It is arranged that the braking of the rear wheels 79 determined by the amount of air allowed through the valve 58 without the effect of the solenoid 99 exceeds that demanded by the input load at the pedal of the tandem master cylinder 70. The wheels thus begin to decelerate more rapidly than the vehicle and the control module 86 produces a signal which is fed to the coil 97 of the brake control apparatus 87. The solenoid core 98 is then moved forwardly away from the end wall 12 and the stem 99 acts on the lever 30 to move the lever angularly about the pin 33 as a fulcrum to oppose the input force and tend to close the air control valve 54.

The braking on the rear wheels 79 will be relieved as will the braking force applied to the brakes on the front wheel 72 through the pipeline 78. The rear wheel 79 will accelerate again as will the front wheels 72, although to a lesser degree, and the sequence described above will then be repeated. The oscillations generally decrease in magnitude until a steady deceleration is established.

The system therefore gives brake control in which the brake pressure applied is modified by the resilient lever 30, causing the opening of the valve 58 to lag behind the input force at the stem 58. This effect is further modified by correcting the pressure required by an amount determined by the magnitude of the feedback force applied to the lever from the stem 99 of the solenoid core 98.

The modified braking system shown in FIG. 3 is substantially identical to the system described above with reference to FIG. 2, and corresponding reference numerals have been used to indicate corresponding parts. However, in this embodiment the pipeline 78 has been omitted so that the brakes on the front wheels 72 of the vehicle are only applied directly from the tandem master cylinder 70, and no assistance is received from the auxiliary master cylinder 77 of the booster assembly 75. The construction and operation of this embodiment is, otherwise the same as that of FIG. 2 and need not be described further herein.

I claim:

1. Brake control apparatus for a vehicle braking system incorporating a brake on at least one wheel of the vehicle wherein the improvement comprises a brake control member adapted to apply the wheel brake, a nonrigid resilient lever adapted to actuate said brake control member, an input member adapted to apply an input force directly to said resilient lever, means responsive to deceleration of said braked wheel adapted to apply to said resilient lever a force in opposition to said input force, and means for urging said resilient lever at all times into engagement with said input member and said deceleration responsive means, the arrangement being such that in an initial application of the brake, said lever exerts a force on said deceleration responsive means directly and, upon deceleration the braked wheel exceeding a predetermined value, said deceleration responsive means exerts a force on said resilient lever in opposition to the input force.

2. Brake control apparatus as claimed in claim 1, wherein said deceleration responsive means comprises an electromagnetic device responsive to signals received from means sensing the deceleration of the braked wheel.

3. Brake control apparatus as claimed in claim 2, wherein said electromagnetic device comprises a magnetic core, a stem on said core adapted to engage one end of said lever, and an electrical coil surrounding said core and adapted to be energised by an electrical current generated by said sensing means to urge said core in a direction to move said lever angularly in a direction opposite to that in which it is moved by said input member, when the wheel brake is applied.

4. Brake control apparatus as claimed in claim 3, wherein said coil is housed in a housing of magnetic material and said core works in a sleeve of nonmagnetic material forming an insulation between said coil and said housing, a part of said housing being provided with a central opening through which projects said stem for engagement with said lever.

5. Brake control apparatus as claimed in claim 2, wherein said deceleration means comprises an electrical sensing unit, and an electronic control module is incorporated to process signals received from said control unit and transmit an energised current to said electromagnetic device.

6. Brake control apparatus as claimed in claim 1, wherein said deceleration responsive means comprise a flywheel mechanism.

7. Brake control apparatus as claimed in claim 6, wherein said flywheel mechanism comprises spindle adapted to be driven from said braked wheel, a flywheel freely rotatably mounted on said spindle, means for driving said flywheel from said spindle including a member rotatable with said spindle and located adjacent to an end face of said flywheel, an arm acted upon by said second end of said lever a pivotal connection between said arm and said member, a ramp portion on said arm, and a ball located between said ramp and said end face of said flywheel, whereby in the application of the brake the input force transmitted to said arm by said lever when in said second position is opposed by a camming action between said ramp and said ball tending to move said lever in a direction opposite to that in which it is moved by said input member.

8. Brake control apparatus as claimed in claim 7, further including a fulcrum located at said first end of said lever and about which said lever is angularly movable in said second position.

9. Brake control apparatus as claimed in claim 7, wherein said first end of said lever is bifurcated and is curved towards said flywheel, and a nonrotatable thrust member is positioned between said lever and said arm, said bifurcated lever end straddling said spindle and being curved towards said thrust member with which said curved end engages.

10. Brake control apparatus as claimed in claim 1, wherein said input force from said input member is proportional to the magnitude of the brake application for brake applications below a predetermined value when said input member is actuated partially, and the resilience of said lever is constructed and arranged that for brake applications below said value, less than full actuation of said brake control member takes place.

11. Brake control apparatus as claimed in claim 1 wherein said lever at said first end has a pair of parallel lugs which extend in the same direction from one side of the lever, and the lugs are provided with alined slots in which is received an end of a fixed pin, said pin being spaced between opposite ends of said slots when said lever is in said first position, and said pin being engaged by a corresponding end of each slot to form a fulcrum about which the lever is angularly movable in said second position.

12. Brake control apparatus as claimed in claim 1, wherein said brake control member comprises a valve controlling the admission of air to a relay valve for applying said wheel brake.

13. Brake control apparatus as claimed in claim 12, wherein said valve includes a valve seating, and spring means adapted to hold said valve in engagement with said seating.

14. Brake control apparatus as claimed in claim 12 wherein said valve included a valve seating, and a spring washer adapted to hold said valve in engagement with said seating.

15. Brake control apparatus for a vehicle braking system incorporating a brake on at least one wheel of the vehicle wherein the improvement comprises a brake control member adapted to apply the wheel brake, a resilient lever adapted to actuate said brake control member, an input member adapted to apply an input force to said resilient lever, means adapted to be driven from the braked wheel and responsive to deceleration of said braked wheel whereby, in the application of the wheel brake, the lever is adapted to exert a force on the deceleration responsive means and, upon excessive deceleration of the braked wheel taking place, the deceleration responsive means produces a force which it exerts on the lever in opposition to the input force, said lever including first and second opposite ends and being movable between a first inoperative position, and a second operative position to apply the wheel brake, a stationary fulcrum with which said lever is engageable in said first position at a point in its length intermediate said first and second ends, and a spring acting on said first end of said lever to move said lever angularly about said fulcrum and to urge said second end of said lever into engagement with deceleration responsive means in said first position, said input member, in the application of the wheel brake, acting on said lever on the side of the fulcrum remote from said second end to move said lever away from said fulcrum and into said second position against the loading in said spring and simultaneously to actuate said brake control member and to transmit said input force to said deceleration responsive means.

16. Brake control apparatus as claimed in claim 15 wherein said fulcrum is adjustable in a direction substantially normal to a main axis of said lever.